United States Patent
Carnation

(10) Patent No.: US 7,168,616 B2
(45) Date of Patent: Jan. 30, 2007

(54) BANK CARD WITH LOTTERY FEATURE

(76) Inventor: Richard E. Carnation, 7633 Lakewood Dr., Suite 205, Windsor, CA (US) 95492

( * ) Notice: Subject to any disclaimer, the term of this patent is extended or adjusted under 35 U.S.C. 154(b) by 0 days.

(21) Appl. No.: 11/089,693

(22) Filed: Mar. 24, 2005

(65) Prior Publication Data

US 2006/0213974 A1 Sep. 28, 2006

(51) Int. Cl.
*G06K 5/00* (2006.01)

(52) U.S. Cl. .................... 235/380; 705/41; 902/25

(58) Field of Classification Search ............... 235/380, 235/381, 383, 375, 376; 705/39, 41; 902/22, 902/23, 25, 40
See application file for complete search history.

(56) References Cited

U.S. PATENT DOCUMENTS

| | | | | |
|---|---|---|---|---|
| 5,649,114 A | * | 7/1997 | Deaton et al. ................. | 705/14 |
| 5,774,884 A | * | 6/1998 | Watanabe et al. ............. | 705/41 |
| 5,857,175 A | * | 1/1999 | Day et al. ..................... | 705/14 |
| 6,578,735 B1 | * | 6/2003 | Mothwurf .................... | 221/255 |
| 2001/0050311 A1 | | 12/2001 | Avelino ....................... | 235/380 |
| 2002/0111918 A1 | * | 8/2002 | Hoshino et al. .............. | 705/65 |
| 2003/0057274 A1 | | 3/2003 | Dawson ....................... | 235/380 |
| 2003/0233278 A1 | * | 12/2003 | Marshall ...................... | 705/14 |
| 2004/0169088 A1 | | 9/2004 | Nelms et al. ................ | 235/493 |
| 2005/0021457 A1 | * | 1/2005 | Johnson et al. ............... | 705/39 |

FOREIGN PATENT DOCUMENTS

| JP | 05250568 A | * | 9/1993 |
|---|---|---|---|
| JP | 08249396 A | * | 9/1996 |
| JP | 2002373303 A | * | 12/2002 |
| JP | 2003248772 A | * | 9/2003 |
| JP | 2004013601 A | * | 1/2004 |
| JP | 2004094470 A | * | 3/2004 |
| KR | 2002022824 A | * | 3/2002 |

* cited by examiner

*Primary Examiner*—Uyen-Chau N. Le

(57) ABSTRACT

A method of purchasing goods and services in combination with a gaming feature is described. Consumers are provided with a bank card, which is used to identify consumers, extend credit to them and communicate purchasing data to a centralized location. A pool of funds is established in relationship to the use of the bank card by consumers. Periodically, a lottery is conducted for distributing prizes to consumers by distributing proceeds from the pool of funds.

2 Claims, 2 Drawing Sheets

BANK CARD WITH LOTTERY FEATURE

FIELD OF THE INVENTION

The present invention relates generally to financial network systems, and more specifically to credit cards than include a lottery feature.

BACKGROUND OF THE INVENTION

For many years, banks and other financial institutions have extended credit to consumers through the issuance of bank cards. Such cards, employing magnetic strips, holograms and other identifiers, which enable consumers to purchase goods and services while credit is extended at the point of purchase. In doing so, financial institutions generally prescreen card holders establishing a credit limit which the consumer is unable to exceed.

It is well recognized that considerable risk is associated with the issuance of bank cards to customers. Each time a customer makes use of his or her bank card, unsecured credit is extended. The default rate through the use of such cards is quite high in comparison to other types of loans, particularly those in which a security interest is taken by the financial institution. Nevertheless, bank cards have proven to be an exceedingly lucrative vehicle upon which banks and other financial institutions derive income.

There are a number of factors which add to the profitability and thus success of bank cards and which support the issuance of unsecured credit with these cards notwithstanding the heightened risk. Many cards have an annual fee payable by the consumer merely for the privilege of possessing the card and enjoying the flexibility of receiving credit contemporaneous to the purchase of goods and services. In virtually all instances, the financial institution charges an interchange fee, typically about 3% or more of the dollar value of the transaction, most of which goes to the financial institution that issued the bank card, but a percentage of which is attributable to the bank card entity, such as Visa, Mastercard, Diner's Club, American Express and Discover Card. Further, if purchases are not paid by consumers within the first billing cycle subsequent to the purchase, interest rates are imposed by the lending institution or bank at rates far higher than those established for secured loans.

In light of the above, it is well recognized that financial institutions and bank card issuers profit to such an extent that certain incentives have been offered to encourage bank card ownership and usage. For example, many lending institutions waive their annual fees. Other bank cards provide consumers with incentives including cash back or cash credits, airline, hotel and vacation credits and customer perks such as travel related services which are extended to bank card holders particularly in foreign countries. As an example, several lending institutions have established pre-existing relationships with airlines whereby for each dollar attributable to a purchase employing the subject bank card, one airline mile of free travel is credited to the consumer's account. This has proven to be quite successful as many bank card holders put virtually every purchase, from common every day groceries to major appliances and even automobiles on their bank cards in order to expand their airline mile credits. The use of incentives to promote bank card usage and the enhanced profitability to bank card companies and banks and lending institutions is a proven business model which has been successfully employed for many years.

Perhaps it is a gross understatement to suggest that earnings from bank cards are quite impressive. It has been determined that there are approximately two hundred million bank cards in the United States alone, each carrying an average monthly balance of $2,500.00 noting further that card holders average $250.00 per month in new purchases. Many of these cards, particularly those providing for purchasing incentives such as airline mileage require annual fees. Further, interest rates, as noted previously, tend to be quite high because of the unsecured nature of the bank card loans. In addition, vendors who accept bank cards for purchases must pay an interchange fee to the lending institution, a portion of which also is creditable to the bank card issuing organization. Each of these component parts add to the profitability which lending institutions and bank card companies enjoy.

It is thus an object of the present invention to provide a novel incentive program to encourage the use of a specific bank card over all others.

It is yet a further object of the present invention to provide a lotto or gaming feature to applicant's bank card to encourage use of this card over its competition.

These and further objects will be more readily apparent when considering the following disclosure and appended claims.

SUMMARY OF THE INVENTION

A method of purchasing goods and services using a bank card that integrates a gaming feature is described. The method comprises providing consumers with a bank card, said bank card being issued to consumers as a means of identifying them and for extending credit to consumers for the purchase of said goods and services. The invention involves establishing a centralized location for receiving purchasing data each time consumers make use of said bank card. A pool of funds is established, the size of which is related to the use of the bank card by consumers. Periodically, a lottery is conducted for distributing prizes to consumers by distributing proceeds from the pool of funds. The odds of a purchaser winning the lottery are in direct relationship to the extent to which he or she uses the bank card for purchasing those goods and services during the interval preceding the lottery drawing.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE PREFERRED EMBODIMENT

A bank card with an integrated lottery feature is described. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Aspects of the present invention can be used in a distributed electronic commerce application that includes a computer network system that links one or more server computers to one or more client computers, as well as server computers to other server computers and client computers to other client computers. The client and server computers may be desktop personal computers, workstation computers, mobile computers, portable computing devices, personal digital assistant (PDA) devices, or any other similar type of computing device. The steps of accessing, downloading, and manipulating the data, as well as other aspects of the present invention are implemented by central processing units (CPU) in the server and client computers executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to embodiments of the present invention.

Embodiments of the present invention are directed to entering a bank card user into a lottery or similar game of chance based upon the amount of the user's purchases during a predetermined period of time. Methods of the present invention involve establishing a pool for the distribution of lottery funds in direct proportion to the use of an applicant's bank card during a specific lottery period, holding the lottery, and notifying lottery participants of the result. Funds for establishing the lottery pool include various elements associated with the credit card transaction, such as the typical interchange and transaction fees, interest on balance carry overs and perhaps annual fees charged by the card issuer to the user. Such proceeds are recorded at a central facility such as centralized computing facility. For purposes of the present application, the terms "bank card" and "credit card" refer to a debit or credit card that is issued by a bank, credit card company, or any other lender to extend funds to a buyer at the point of purchase. The point of purchase may be a retail store, mail order company, Internet web site, or any similar retail operation.

Figure 1:
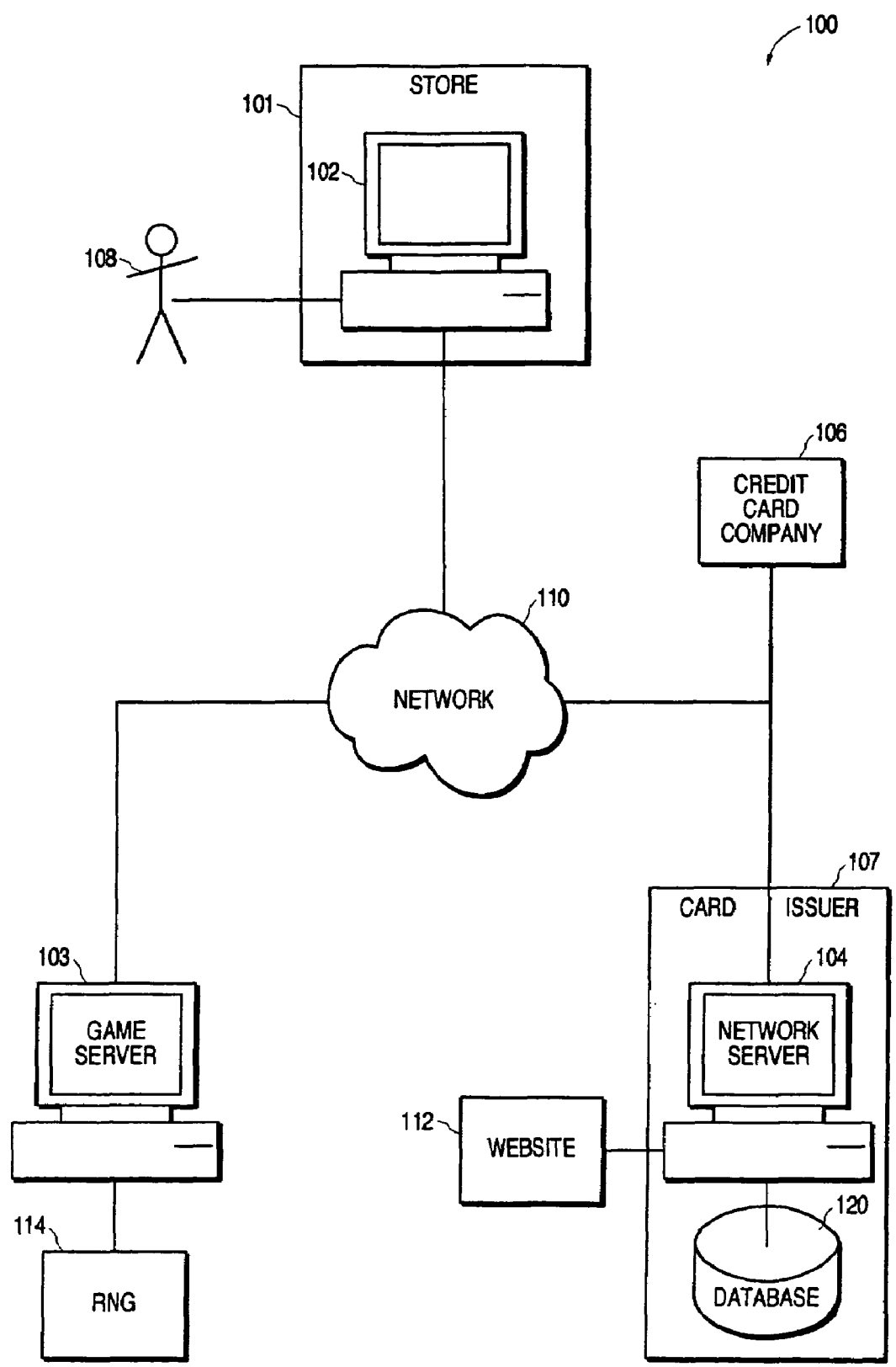
FIG. 1 illustrates a network environment that can be used to implement embodiments of the present invention.

FIG. 1 illustrates an overall computing environment 100 that can be used to implement embodiments of the present application. Program components comprising the finance and gaming aspects of the present invention may be executed on one or more client 102 and server 104 computers coupled through a network 110. The network 110 may be a simple peer-to-peer connection, a private network (e.g., LAN), a wide area network (WAN), or the Internet. For the embodiment in which the network 110 comprises the Internet, the client and server computers communicate using an Internet protocol. In the World Wide Web environment, the network client computer 102 typically accesses the Internet network 110 through an Internet Service Provider (ISP) and executes a web browser program to display data content through web pages. In one embodiment, the web browser program is implemented using Microsoft® Internet Explorer™ browser software, but other web browser programs may also be used. For the web-based implementation, the server computer 104 executes a web server process that serves web content from a web site 112 maintained on the server computer 104.

For the client-server or Internet embodiments, the system 100 may also include other networked servers, such as credit card, bank or financial service computers 106, supplemental servers 103 that provide gaming or lottery services, or similar server computers. It should also be noted that the network illustrated in FIG. 1 is intended to include a plurality of server computers coupled to a plurality of client computers.

In operation, a retail facility representing a remote purchasing location 101 accepts a bank card from a user 108 for purchase of goods or services. To accept the user's bank card, the retailer requests authorization for the purchase from a centralized computer (network server) 104 maintained by the user's bank or bank card issuer 107. Upon completion of the purchase transaction, the transfer of funds through debit of the user's account or extension of credit to the user is confirmed with network server 104, whereupon an electronic record is made of the purchase including its amount in association with the bank card holder whose identity and related information is of record with the card issuer 107.

The card issuer 107 is responsible for fulfilling the transaction between the buyer 108 and the retailer 101. The card issuer may be a bank or credit card company. Alternatively, it may be a third party financial service provider that issues credit to the buyer. In this case, the card issuer 107 may be associated with or utilize the resources of a credit card company, such as Visa® or Mastercard®, in order to provide the issuance of credit to the user.

To increase the motivation for a card holder to employ a particular bank card in making a purchase at remote purchasing location 101 to the exclusion of other bank cards in the purchaser's possession, a chance to compete for one or more prizes in a lottery drawing is associated with the use of the card for the purchase. As such, it is a feature of the present invention to be able to communicate to the purchaser certain lottery numbers or other identifying indicia to enable the purchaser to track this identifying information and to associate it with a lottery drawing conducted at a later point and time. In one method of associating a purchase with a lottery, at the time of purchase at remote purchasing location 101, the card issuer 107 can engage a random number generator that creates a series of lottery numbers virtually simultaneously with the purchase being conducted at remote purchasing location 101. Random number generators have been in use for quite some time and are currently being employed at least by the California State Lottery in generating its "Quick Picks" function engaged in by millions of lottery players each week. These random numbers associated with a specific bank card holder and specific purchase are recorded in a database 120 maintained by the network server 104 and maintained of record at least until the next lottery is carried out.

The random number generator function utilized for the generation of lottery numbers can be a resident process executed by the network server 104, or it can be a process executed by a supplemental server, such as game server 103 maintained by a game administrator and executing a random number generator (RNG) process 114.

The randomly generated lottery numbers could be directly and simultaneously transmitted to client computer 102 maintained at the remote purchasing location 101. The bank card user would then receive a paper copy of those numbers as a personalized tracking feature confirming entry into the upcoming lottery. This paper record would also display the date of the next scheduled lottery drawing to ensure that these numbers would only pertain to a specific lottery drawing.

In an alternative embodiment, the random number generator process could also provide a bank card holder at remote purchasing location 101 with an instant lottery prize. A pool could be established whereby relatively smaller valued prizes could be attributed to a purchase which could range from a dollar to several thousand dollars and include related prizes such as free trips and gifts as well as reimbursement for the purchase currently being conducted. All of these features would tend to encourage use of the present bank card to the exclusion of its competition.

Alternatively, or as an addition to providing a consumer with a paper copy of lottery numbers attributable to a purchase, the card issuer 107 could communicate pertinent lottery-related information to the eligible bank card holders through a website 112. Generally, the website would be available to the public as an advertising medium promoting applicant's bank card and related lottery feature. The projected grand prize and secondary prizes, if any, could be displayed on remote website 112. However, in order to track a bank card holder's total purchases during the current lottery period as well as to track the specific lottery numbers attributed to such purchases, the bank card holder would be called upon to enter the appropriate bank card number and personal identification number (PIN). The actual lottery drawing results could also be posted on the website as the subject lottery drawing is held.

Figure 2:
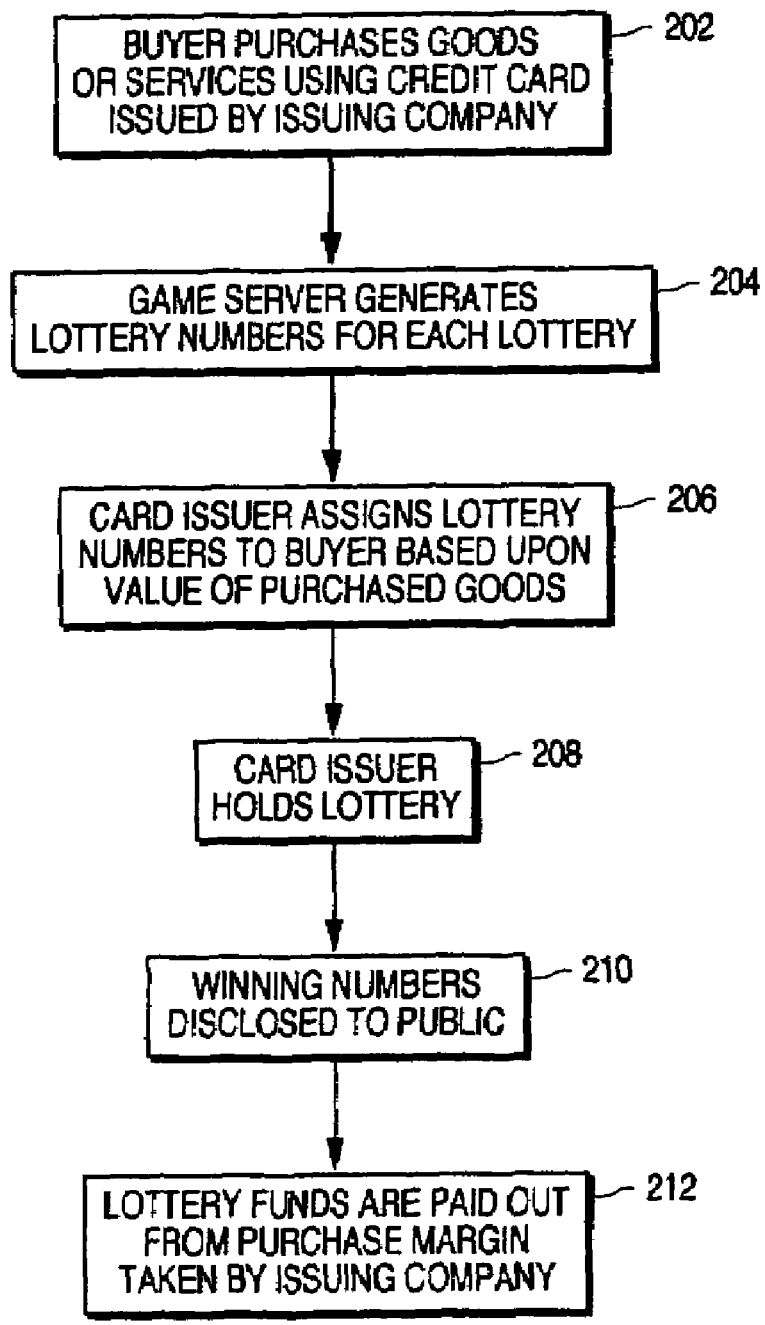
FIG. 2 is a flowchart that illustrates the steps of associating a gaming function with purchases using a bank card, according to a method of the present invention.

FIG. 2 is a flowchart that illustrates a method of associating a lottery with a bank card purchase, according to one embodiment of the present invention. In step 202, a buyer purchases goods or services using a credit card issued by the issuing company. This card makes the user eligible for lottery drawings held by the card issuer or other game administrator. A game server function executed by the card issuer or separate game administrator generates lottery numbers for each lottery using a random number generator process, step 204. The card issuer assigns lottery numbers to the buyer based upon the value of purchased goods, step 206. The value of the purchase is related to the purchase value, and therefore the degree of card usage. The more the buyer uses the card, the greater are his or her chances of winning a prize. The assignment of numbers to purchase value is defined by the card issuer or game administrator, and depends on the type and size of the lottery. For example, the card issuer may issue a single lottery number for each dollar spent during a credit card transaction, or a certain number of lottery numbers can be assigned for every x dollars spent during a certain period of time.

Each lottery is held open for a predetermined period of time during which a buyer's use of the card generates a certain batch of lottery numbers. At the end of the lottery period, the card issuer holds the lottery, step 208. The winning numbers are then disclosed to the public, step 210, such as through website 112. The prizes are then disbursed to the winning card holders. The prizes are paid out from the lottery fund, step 212. The lottery fund can be established from the bank interchange fees, periodic interest fees, annual fees, or any other fees charged to the user of the card from the card issuer 107 or credit card company 106

In carrying out the present method, it is necessary that applicant be associated with an entity capable of offering a lotto or gaming feature to the general public. Such entities include American Indian tribes who are authorized to engage in gaming pursuant to the federal Indian Gaming Regulation Act (IGRA) 25 U.S.C. Section 2701–2721. The policy of the IGRA is to provide for tribal economic development, self-sufficiency, and strong tribal government. In doing so, 25 U.S.C. Section 2701(5) provides tribes with "the exclusive right to regulate gaming activity on Indian lands if the gaming activity is not specifically prohibited by federal law and is conducted within a state which does not, as a matter of criminal law and public policy, prohibit such gaming activity." The issuance of bank cards in conjunction with the IGRA is contemplated as one embodiment for carrying out the present method.

It is contemplated by applicant that one or more Indian tribes would act as issuers of the appropriate bank card with lottery feature either alone or in conjunction with an established bank card provider 106 such as Visa or Mastercard. If a relationship is established with a bank card provider, that bank card provider would receive its typical transaction fee. Nevertheless, the interchange fees attributable to each purchase as well as ongoing interest charges for accumulated bank card balances would be more than enough to establish significant funding for lottery prizes while still enabling the Indian tribe to realize significant earnings.

In the foregoing, a system has been described for integrating lottery or similar gaming features with use of a credit or bank card. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of purchasing goods and services in combination with a gaming feature, said method comprising providing consumers with a bank card, said bank card being issued to the consumers as a means of identifying the consumers and for extending credit to the consumers for a purchase of said goods and services, establishing a centralized location for receiving purchasing data each time consumers make use of said bank card, establishing a pool of funds, the size of which is related to the use of said bank card by said consumers, periodically conducting a lottery for distributing prizes to consumers by distributing proceeds from the pool of funds, said lottery being conducted periodically at regular intervals wherein odds of winning said lottery are in direct relation to the extent of said bank card usage during a regular interval immediately proceeding said lottery wherein said consumers are notified during said regular interval of the number of chances attributable to them with respect to the next lottery drawing in direct relation to the extent of purchases made during said interval wherein said consumers are so notified by enabling them to access a website operated from said centralized location.

2. A method of purchasing goods and services in combination with a gaming feature, said method comprising providing consumers with a bank card, said bank card being issued to the consumers as a means of identifying the consumers and for extending credit to the consumers for a purchase of said goods and services, establishing a centralized location for receiving purchasing data each time consumers make use of said bank card, establishing a pool of funds the size of which is related to the use of said bank card by said consumers, conducting a lottery for distributing prizes to consumers by distributing proceeds from said pool of funds, wherein said lottery is conducted periodically at regular intervals wherein odds in winning said lottery are in direct relationship to the extent of use of said bank card during a regular interval immediately proceeding the lottery and wherein numbers are provided to consumers for each purchase of goods and services using said bank card during said interval wherein one lottery number is attributable to each dollar of purchase of said goods and services.

* * * * *